Sept. 15, 1970 O. KNEISEL ET AL 3,529,289

PULSE CODE CONVERTER APPARATUS

Filed Nov. 16, 1965

United States Patent Office 3,529,289

Patented Sept. 15, 1970

3,529,289

PULSE CODE CONVERTER APPARATUS

Otto Kneisel, Herbststrasse 28, Gauting, Germany; Edmund Ptacnik, Ahornweg 20, Socking, Germany; and Karl-Anton Lutz, Strahuberstrasse 12, Munich-Solln, Germany Filed Nov. 16, 1965, Ser. No. 508,126
Claims priority, application Germany, Nov. 17, 1964, S 94,210
Int. Cl. H04l 3/02, 1/10
U.S. Cl. 340—146.1 6 Claims

ABSTRACT OF THE DISCLOSURE

System for on command conversion and re-storing of multi-element information stored in pulse form in a plurality of circulation stores, for instance for counting of time-spaced signal pulses. The store outlets are directly connected to the inlets of the converter, but the converter outlets are connected to the inlets of the stores only upon receipt of a command pulse. At all other times the store inlets are connected to the corresponding outlets thereof for recirculation of the stored pulses.

GENERAL DESCRIPTION OF THE INVENTION

This invention relates to message processing systems for long distance communication installations, and in particular, for time multiplex telephone exchange systems. Such apparatus often require the use of circulating stores or registers for registration of information, such as the connections existing at any one particular time in a time multiplex exchange system, or identifications of the individual subscribers of such a system.

A circulating store generally is formed by a delay line, such as a magnetostrictive wire, with appropriate input and output circuits, within which a pulse may be inserted and will then appear at an output at an appropriate delay time thereafter. The input and output circuits can be interconnected so as to provide for automatic recirculation of the pulse in the same pulse phase. With a system of this type, a number of pulses representing information elements or bits can circulate periodically in the circulating store, the number being determined by the length of the circulation or access time of the store. In systems employing circulating stores of this type, frequently a group of bits must be simultaneously registered, so that several such circulating stores are provided and the bits forming a group are registered in parallel fashion, in the same pulse phase, in the different circulating stores.

It is often necessary with systems of this type, that the form in which information is recorded in a store be changed, or that new information be substituted for information previously registered. An illustration of such a requirement occurs in a time multiplex telephone exchange wherein dial information identifying a called subscriber is registered at the moment the calling subscriber causes such information to be emitted, this calling number being registered in the pulse phase assigned to the connection. This registration may be in a circulating store for addresses of subscribers being called and participating in connections. After the registration, a test of the line of the desired subscriber will be carried out to determine whether the subscriber is idle or busy, and if this test results in identification of the subscriber's line as being idle, the connection number, rather than the calling number, may be required to be registered in the circulating store. For this purpose, it has been known in the past to provide an address generator which successively emits the individual connection numbers of the subscribers, and whose output is connected to a converter which is also supplied with the calling numbers of the called subscribers. Such a system employs a comparator which compares the calling numbers registered in the address circulation store and upon indication of identity, upon indication also of idleness of the subscriber, the connection number is then registered in the address circulation store, from the address generator, rather than the calling number being re-registered therein.

Another illustration of the need for changing information registered in circulating stores is in the case of scanning the connection lines of a telephone exchange system for reception of dial information appearing in the form of dial pulse series. In such a scanning system, the scanning frequency is sufficiently rapid that a signal pulse is forwarded for each dial pulse and the signal pulses originating from scanning of a certain connection line are counted by a counting apparatus in order to make possible conversion of the dial information into another form of representation. A plurality of sources may be connected simultaneously to the line on which the dial pulses appear, so that a number of successions of time-spaced signal pulses may result. Moreover, these intermixed time pulse successions must be counted separately without interference between the pulses from different sources.

The counting of such pulses from various sources can be accomplished by use of a known binary counting apparatus, shown in British Pat. No. 858,276. This patent discloses a system employing a series of circulation delay line stores, each having capacity for storing a single bit of information at any one instant. In this apparatus, the output of each delay line store is extended to a coincidence gate whose other inlet is connected with the inlet of the same delay line store. The output of the gate is extended to the inlet of the following delay line store of the next stage, and also to the cancellation inlet of another gate connected to the inlet of the first-mentioned delay line store. The time-spaced pulses which are to be counted are conveyed to the counting apparatus over a single input conductor, so that pulses of the same pulse succession (from the same source), follow one another at intervals equal to a certain minimum pulse period or an integral multiple thereof. The circulating or access time of the individual delay line stores is selected to be equal to this minimum pulse period.

Another known circuit arrangement, shown in German published specification 1,016,763, is very similar to the British patent system, but makes it possible to count the pulses of pulse successions which are supplied in a 2 out of 5 code. In this same connection, it is also known from German Pat. 1,151,015 (British equivalent 923,326) that a system for counting a succession of input pulses of a certain code can employ a series of circulation delay line registers or stores, with gate circuits assigned to each register, such gate circuits being supplied with the outputs of the registers. In this system, the delay line stores which are not associated with the first counting stage, are provided with additional individual inlet circuits so connected as to receive the pulses to be counted in parallel fashion, so that the pulses are transmitted to all of the stages simultaneously. Moreover, each store provides a priming connection to prepare the gate associated with the inlet circuit of the next adjacent stage, so that the next stage corresponding to the counting code is advanced with receipt of an input pulse from the common line, simultaneously with receipt of a pulse from the store associated with the previous stage. Additionally, the gate associated with each stage subsequently to the first also supplies a cancellation pulse to the preceding store, so that when a pulse is registered in the store of one stage, the pulse earlier circulating in that phase in the preceding stage is simultaneously cancelled.

In these known counting apparatus, an information connection circuit is connected between the outlets of the stores and the inlets, with the inlets also connected to the inlet of the counting apparatus, and this information connection circuit controls the several gates, including AND, OR and blocking gates, in such manner that bits previously registered in the individual circulating delay line stores are re-registered in the absence of new counting pulses, and are transferred forward to successive stores upon occurrence of a new counting pulse, while the pulses in immediately previous stores are then cancelled.

The apparatus of the present invention is designed to provide a new way to make possible separate conversion of information registered in individual pulse phases in a plurality of circulating stores. The apparatus of the invention employs command pulses and uses a converter which is directly connected to the outputs of the circulation stores to continuously convert the information stored in those stores into the desired information, independently of the conversion commands. The apparatus also includes a commutator connected to the inlets of the circulation stores and operable to connect those inlets either directly with the outlets, or, upon appearance of a conversion command pulse, to connect the inlets of the stores to the outlets of the converter.

The apparatus of the present invention achieves a special flexibility and amenability to change, by means of this system in which a converter continuously operates to perform the conversion, but causes storage of the converted information only upon occurrence of a command pulse. This feature of flexibility and amenability to change is achieved by reason of the separation of the path over which information is registered in unchanged fashion, from the path over which converted information is registered. The result is that a simple exchange of the converter itself, without further circuit changes, can be effective to allow the circuit arrangement to perform different functions. Moreover, standardization of the elements of the system is also achieved, such feature having well-known advantages.

It will be evident that the system of the invention can be used in conjunction with the prior types of counting apparatus, with the outputs of the circulation stores permanently connected to the converter to perform conversions of the pulses instantaneously circulating in the stores, independently of the appearance of a counting pulse, to convert the counting information into information resulting from execution of a counting step. Also, since the connection gates required for execution of counting steps are not included in the circulating path from the output to the input of the stores, independently of non-execution of a counting step, it is possible to count in one or another code, without the necessity of interference in the counting arrangement and without having to cancel the register contents each time, this occurring by simple exchange of the employed converter, or by priming another converter of a group of parallel converters. It is even possible that a change in the type of conversion can take place from one pulse phase to the other, in the same fashion. The invention also permits testing of the results of the conversion, simultaneously with the conversion itself, so that only informatiton represented in a desired given code is registered in the circulating stores, instead of information previously registered. For this purpose, according to a further feature of the invention, a code testing apparatus can be connected to the converter, operable to render ineffective the connection of the inlets of the circulating delay line stores with the outlets of the converter, as controlled by the commutator.

By reason of the fact that information appearing at the outlets of the circulation stores is converted in every instant, and in certain instances may be subjected to code testing, the connection or non-connection between the outputs of the converter and the inlets of the stores is made simpler, and in the event of code testing, is also made at the earliest possible time. Consequently, there still remain sufficient time for the actual operation of completing or interrupting the connection, even if the command for such a connection appears toward the end of the pulse phase. This is a great advantage over a system in which the command pulse itself causes the connection of the outlets of the stores to the converter inlets, since a late pulse in such case would be extremely disadvantageous to the conversion operation. A similar result is achieved when counting pulses arrive late for comparison and counting with previously-registered counting information.

The invention is also of great advantage with respect to the system in which the connection number of a dialed subscriber is to take the place of the calling number of that subscriber which was previously registered, when that connection was found to be idle, since the system of the present invention employing a converted directly connected to the outputs of the address circulation register, can convert each calling number appearing at the output fo the register into the corresponding connection number and a commutator connected to the input of the address circulation register can supply the connection number to the inlet of the register, or cause re-registration of the calling number therein, depending on the result of the test for idle of that connection.

DETAILED DESCRIPTION

The invention will now be more fully described in conjunction with drawings showing a preferred embodiment thereof. In the drawings.

Figure 1:
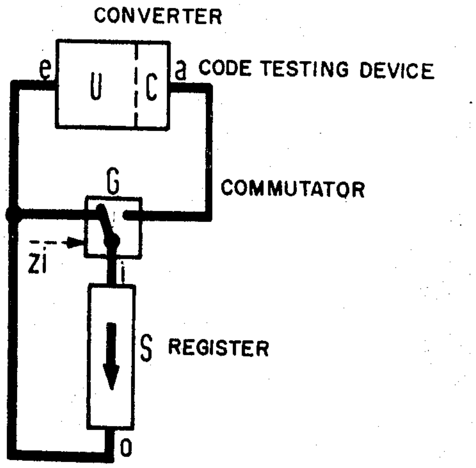
FIG. 1 is a diagrammatic illustration of the apparatus of the invention.

FIG. 1 shows by means of a single conductor representation, the basic construction of a circuit arrangement according to the invention, by which conversion of information individually registered at different pulse phases, can be caused upon appearance of command pulse successions supplied in time-spaced fashion at the pulse phases in question, these stored items of information being stored in circulation registers or stores. The circulation stores are shown in FIG. 1 at S and have outlets designated at *o*. The single heavy line there indicated, in common with the other heavy lines of FIG. 1, illustrate that a plurality of conductors is represented thereby. Astually, there would be a plurality of circulation stores contained in the single block labeled S and a corresponding number of outlets coming therefrom.

A converter U is directly connected to the outlets *o* of the register S. A commutator G is connected between the outlets *o* of the stores S and the inlets *i* thereof. This commutator completes the connection between the outlets and inlets of the stores only when no command pulse is available on the inlet line *zi*. If a command pulse is received along the line *zi*, the commutator is in its other condition in which it connects the outlets *a* of converter U to the inlets *i* of the circulation stores S. Whether or not a command pulse is furnished, and therefore, no matter the condition of commutator G, the converter U converts each item of information appearing at the outlets of the circulation register, and therefore, at the converter outlet *e*, into different information at the execution of a conversion command. The apparatus of FIG. 1 operates generally as follows:

Assuming that an information element registered in the stores S at a certain pulse phase is now available at the outlets *o* of the stores, this information is supplied to the converter U, where it is converted into appropriate different corresponding information, upon execution of a conversion command. Following the conversion, the converted output is available at the converter outlet *a*, and therefore at the right hand input of the commutator G. The original information, stored in the stores S also is available at the left hand inlet of the commutator G.

If, at this time, no command pulse appears on the command pulse inlet *zi*, the commutator G remains in the position indicated in FIG. 1. Consequently, the information then present at the outlets of the stores S is re-registered at the end of the pulse phase, in the same stores. In the next pulse phase, the information registered in the circulation registers S appears at the outlet *o* and is again supplied to the converter U and to the left-hand input of the commutator G. The converted information of course again appears at the right hand inlet of commutator G. If a command pulse then appears at the inlet *zi*, the commutator G assumes the other position, so that the information supplied from the conversion outlets *a* are registered in the stores, instead of the information previously registered therein at that pulse phase.

The circuit apparatus of FIG. 1 continues to operate in corresponding manner during the further pulse phases, until the information first referred to again appears at the outlets *o* of the circulation stores S. At this point, this information will either be re-registered into the stores if no command pulse is available at the inlet *zi*, or the converted information will be registered in place thereof. The command pulses associated with information successively registered at the same pulse phase, thereby form command pulse successions which are supplied in time-spaced fashion from the command pulses of other pulse phases. The succession is such that the command pulses of a particular succession corresponding to the information available from one source, for instance, have a cycle which is equal to the circulation time of the individual stores S, or to an integral multiple thereof.

In FIG. 1 the converter U is also shown as supplied with a block indicated by the letter C, which may be a code-testing device operative to prevent the commutator G from connecting the outlets *a* with the store inlets *i*, upon appearance of the comand pulse, in the event the converted information does not appear in the correct code. Such a system can be provided with blocking gates connected in front of the outlets *a* and which are opened only upon proper test result.

Figure 2:
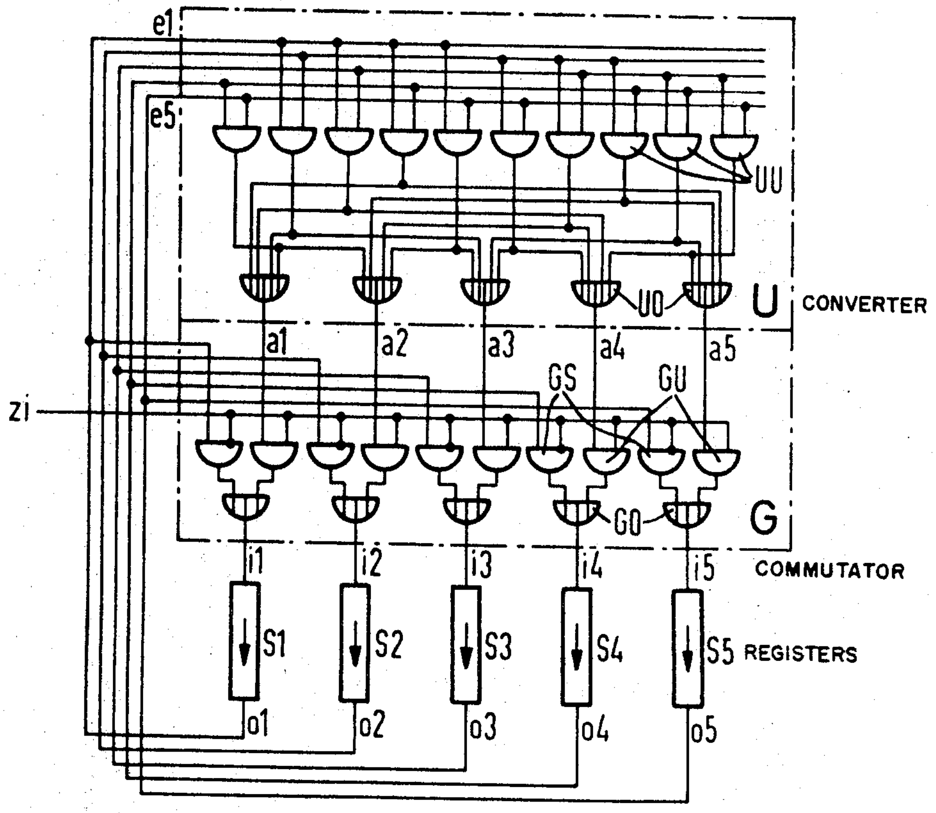
FIG. 2 is a schematic illustration of one form of the apparatus of FIG. 1.

FIG. 2 shows in more detail an operative embodiment of a multi-stage counting apparatus according to the invention, for separate counting of pulses of impulse successions which are spaced in time from each other. This counting apparatus includes circulation delay line stores S1 . . . S5, each of which is capable of registering a single bit at any one time. The outlets *o*1 . . . *o*5 of these stores S1 . . . S5 are directly connected to the inlets *e*1 . . . *e*5 of a converter U. This converter is operable to convert counting information appearing at the outlets *o*1 . . . *o*5 into appropriate other information resulting from execution of a counting step, independently of the appearance or non-appearance of a command pulse, or pulse to be counted at the inlet *zi*. For this purpose each outlet *a*1 . . . *a*5 is supplied with the output of an OR gate UO, the inlets of the OR gates being obtained from the outlets of coincidence gates UU. As will be apparent hereinafter, the coincidence gates are arranged and connected in such a fashion as to cause the conversion operation to occur.

An AND or coincidence gate GU is connected to each outlet *a*1 . . . *a*5 of the converter U, and has its other inlet supplied with the pulse succession on the line *zi*. The output of each AND gate GU is directed to one of the inputs of an OR′ gate GO, with the outputs of the OR gates GO connected to the inlets of the respective circulation time delay stores S1 . . . S5. The other inlet of each OR gate is connected to a blocking gate GS which has its blocking inlet supplied with the counting pulses available on line *zi*, and its signal inlet connected to the outlets *o*1 . . . *o*5 of the circulation stores S1 . . . S5. It will be seen that the respective AND, OR and blocking gates GU, GO and GS form the commutator G of FIG. 1.

The converter U of the apparatus of FIG. 2 is so formed as to convert the pulses appearing at the inlet *zi*, which correspond to a particular pulse succession, into a 2 out of 5 code representation of the next counting step. If, for example, in a certain pulse phase, there appear at the outlets *o*1 . . . *o*5 of the stores S1 . . . S5, information elements 00110 corresponding to the counting results registered in this particular pulse phase up to that time, the coincidence condition will be fulfilled for the next to last coincidence gate UU in the converter U. Consequently, the outlets *a*3 and *a*5 of the converter U will have a voltage available thereon. The converter will therefore supply at its outlets *a*1 . . . *a*5 the information elements 00101. If, at the same time, a new counting pulse appears at the inlet *zi*, the blocking gates GS for the counting information appearing at the store outlets *o*1 . . . *o*5, are blocked and simultaneously the AND gates GU for the converted counting information 00101 are opened. The result is that the converted counting information from the execution of the counting step, is registered, rather than the previously-registered information, in the registers S1 . . . S5. This will be recognized as the sum of the previously-registered count and the additional single counting pulse, in the 2 out of 5 code.

Other counting information appearing at the register outlets *o*1 . . . *o*5 are similarly treated. Moreover, in the remaining pulse phases, whenever no counting pulse appears at the inlet *zi* in a particular pulse phase, the counting information already registered in that pulse phase is re-registered over the blocking gates GS and the OR gates GO, in the circulation stores S1 . . . S5.

In the apparatus of FIG. 2, the converter operates in the 2 out of 5 code. However, it will be appreciated that suitable other forms of the converter can be employed, such as for instance, for multi-stage dual counting for separate counting of pulse successions which are time-spaced from each other. For this purpose, in a further development of the invention, the converter U may be so constructed that a blocking gate leads to each outlet *a*1 . . . of the converter which leads to a particular circulation time store S1 . . . , with the blocking inlet of the gate connected to the inlet *e*1 . . . of the converter connected to the outlet *o*1 . . . of the store S1 in question, and with the blocking gates also having their signal inlets respectively connected to the inlets *e*1 . . . of the converter U, proceeding in the succession of the stores S1 . . . .

Finally, instead of a single converter, a group of converters may be provided to convert information appearing at the register outlets in accordance with an individual code, so that, in place of the single commutator G of FIG. 1, a group of individually-operable commutators is provided. This group of commutators would then be operable upon appearance of a command pulse, depending on the kind and position of appearance of the pulse, to register information obtained by the conversion in the circulation registers, instead of information previously registered, or upon absence of a command pulse, to cause information previously registered to be re-registered.

It will be evident that many other changes could be made in the apparatus of the invention without departure from the scope thereof. Accordingly, the invention is not to be considered limited to the embodiments specifically described herein, but rather only by the scope of the appended claims.

We claim:

1. In a circuit apparatus for separate conversion of a different multi-element information registered in separate pulse phases in a plurality of circulation time stores for storage of converted information of the same character in those stores, upon receipt of a conversion command, the improvement comprising:

a converter (U) having a plurality of inlets (*e*) respectively connected directly to the outlets (*o*) of the circulation stores, said converter being operable to convert the information appearing at the store outlets into different information independently of command for such conversion, and a commutator (G) having a plurality of outlets respectively connected to the inlets (*i*) of the stores and operable in the absence of a conversion command to connect the outlets (*o*) of each store back to the inlet of the same store, but operable upon receipt of a conversion command to connect the inlets of the stores to the outlets (*a*) of the converter to cause storage therein of the converted information.

2. The apparatus of claim 1 in which said converter has a code tester associated therewith to test the converted information and prevent supply thereof to the stores in the event the code tester detects a mistake in conversion.

3. In a circuit apparatus for multi-stage counting of time-spaced signal pulses of different pulse successions, with the pulses of each succession spaced by a predetermined minimum time interval or an integral multiple thereof, and including a circulation time store for each stage of the counter operable to supply at their outlets at each pulse phase pulses registered at their inlets in the same pulse phase in the previous cycle measured by said minimum time interval, the improvement comprising:

a converter (U) having a plurality of inlets (*e*) respectively connected directly to the outlets (*o*) of the circulation stores, said converter being operable to convert the count instantaneously indicated by pulses available at the outlets of the stores into a pattern of pulses representing the next count, independently of arrival of a pulse to be counted at that instant, and a commutator (G) having a plurality of outlets respectively connected to the inlets (*i*) of the stores and operable in the absence of a conversion command, represented by a pulse to be counted in that pulse phase, to connect the outlet of each store back to the inlets of the same store, but operable upon a receipt of a pulse to be counted to connect the inlets of the stores to the respective outlets (*a*) of the converter to cause storage in the stores of the new advanced count.

4. The apparatus of claim 3 in which said commutator includes a different blocking gate (GS) having one inlet connected to the outlet of each store, with the signal pulses connected to the blocking inlet thereof to block the gate except during the intervals between signal pulses, an AND (GU) gate for each store having one inlet connected to an outlet (*a*) of the converter, with the signal pulses connected to the other inlet of each AND gate, and an OR gate (GO) for each store having its outlet connected to the inlet of that store and its inlets connected to the outlets of a corresponding pair of the AND and blocking gates.

5. The apparatus of claim 4 in which said converter includes a plurality of OR gates (UO) whose outputs form the outlets of the converter, each OR gate being supplied with the outputs of a plurality of conversion AND gates (UU) whose inlets are connected to various combinations of the outlets of the stores (S1–S5) determined by the conversion process necessary to advance the count in the selected code.

6. The apparatus of claim 3 in which said converter includes a plurality of OR gates (UO) whose outputs form the outlets of the converter, each OR gate being supplied with the outputs of a plurality of conversion AND gates (UU) whose inlets are connected to various combinations of the outlets of the stores (S1–S5) determined by the conversion process necessary to advance the count in the selected code.

References Cited

UNITED STATES PATENTS

| | | | |
|---|---|---|---|
| 2,798,667 | 7/1957 | Spielberg et al. | 340—347 X |
| 3,316,355 | 4/1967 | Hanna et al. | 179—18 |
| 2,805,286 | 9/1957 | Baker. | |
| 3,059,851 | 10/1962 | Robinson | 236—165 |
| 3,303,463 | 2/1967 | Hamburgen | 340—146.1 |
| 3,414,883 | 12/1968 | Hildebrand et al. | 340—173 X |

OTHER REFERENCES

Watts S. Humphrey, Jr.: Switching Circuits with Computer Applications, 1958, McGraw-Hill Book Company, Inc., New York, N.Y., page 118, TK 7885 H8.

MALCOLM A. MORRISON, Primary Examiner

R. S. DILDINE, Jr., Assistant Examiner

U.S. Cl. X.R.

235—153